UNITED STATES PATENT OFFICE.

OSCAR DRESSEL, OF ELBERFELD, AND RICHARD KOTHE AND HEINRICH HOERLEIN, OF VOHWINKEL, GERMANY, ASSIGNORS TO FARBENFABRIKEN VORM. FRIEDR. BAYER & CO., OF ELBERFELD, GERMANY, A CORPORATION OF GERMANY.

DYE.

978,438.  Specification of Letters Patent.  Patented Dec. 13, 1910.

No Drawing.  Application filed May 19, 1910. Serial No. 562,282.

*To all whom it may concern:*

Be it known that we, OSCAR DRESSEL, RICHARD KOTHE, and HEINRICH HOERLEIN, citizens of the German Empire, residing, respectively, at Jägerstrasse 18, Elberfeld; Bismarckstrasse 97, Vohwinkel, and Bismarckstrasse 93, Vohwinkel, Germany, have invented new and useful Improvements in Dyes, of which the following is a specification.

Our invention relates to the manufacture and production of new azo dyestuffs suitable for dyeing wool which are obtained by combining the diazo compounds of aminoarylsulfonamids with alpha-methylindol compounds, especially methylketol ($Pr_2$-methylindol), $Pr_{1n}$-2-dimethylindol, $B_3$-chloro-$Pr_2$-methylindol, $B_3$-chloro-$Pr_{1n}$-ethyl-2-methylindol, $B_3$-methyl-$Pr_{1n}$-ethyl-2-methylindol, $B_3$-$Pr_{1n}$-2-trimethylindol.

The nomenclature used for the above substances is the modern one adopted for the indol molecule namely:

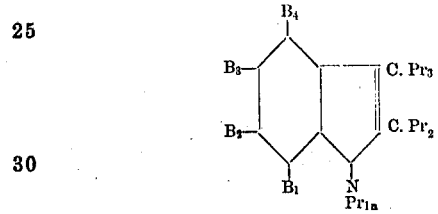

(See Winther Vol. II page 478).

The new dyestuffs are after being dried and pulverized in the shape of their alkaline salts from yellow to orange powders soluble in water and in concentrated sulfuric acid with a yellow color; yielding upon reduction with stannous chlorid and hydrochloric acid an aminoarylsulfonamid and an amino-alpha-methylindol. They dye wool in yellow shades which are remarkable for their excellent fastness to milling, washing and light.

In order to illustrate the new process more fully the following example is given, the parts being by weight:—39.2 parts of 4-toluidin-2-sulfonyl-1-naphthylamin-5-sulfonic acid:

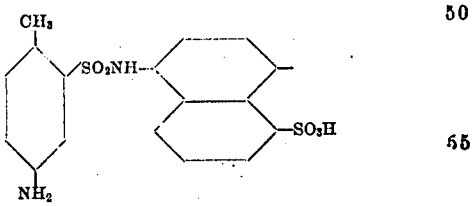

are dissolved in dilute caustic soda lye to a neutral solution which is cooled with ice. 40 parts of hydrochloric acid (19° Bé.) and then a solution of 6.9 parts of sodium nitrite is added. The diazo compound separates in the shape of a yellow precipitate. The whole mass is then added to a cold solution of 13.1 parts of alphamethylindol in 190 parts of hydrochloric acid (19° Bé.). It is stirred until the production of the dyestuff will be completed. The new coloring matter is filtered off, dissolved in a sodium carbonate solution, salted out, filtered off and dried. It is after being dried and pulverized in the shape of its sodium salt a yellow powder, soluble in water and in concentrated sulfuric acid with a yellow color. It dyes wool from acid baths brilliant greenish-yellow even shades fast to light and to milling. Upon treatment with stannous chlorid and hydrochloric acid it is split up, 4-toluidin-2-sulfonyl-1-naphthylamin-5-sulfonic acid and amino-alpha-methylindol being obtained.

The process is carried out in an analogous manner on using other sulfonamids *e. g.*, ortho-anisidin-para-sulfonanilid ($C_6H_4OCH_3$: $NH_2$: $SO_2$.$NH$.$C_6H_5$=1:2:4), ortho-toluidin-para-sulfontoluidin ($C_6H_4CH_3$: $NH_2$: $SO_2$.$NH$.$C_6H_4$.$CH_3$),
    1     2     4    1¹         4¹ ortho-chloro-anilin-para-sulfonxylidid $C_6H_3Cl$: $NH_2$: $SO_2$.$NH$.$C_6H_3$<$^{CH_3(2^1)}_{CH_3(4^1)}$,
 (1)(2)   (4)  (1¹)

4-toluidin-2-sulfonyl-1-naphthylamin-4-sulfonic acid, 4-toluidin-2-sulfonyl-para-sulfanilic acid, 4-toluidin-2-sulfonyl-meta-sulfanilic acid.

We claim:—

1. The herein described new dyestuffs obtainable by reacting upon alpha-methylindol compounds with diazotized aminoarylsulfonamids, which dyes are after being dried and pulverized in the shape of their alkaline salts from yellow to orange-yellow powders soluble in water and in concentrated sulfuric acid with a yellow color; yielding upon treatment with stannous chlorid and hydrochloric acid an aminoarylsulfonamid and an amino-alpha-methylindol and dyeing wool from acid baths yellow shades, substantially as described.

2. The herein described new dyestuff obtainable by reacting upon alpha-methylindol with diazotized-4-toluidin-2-sulfonyl-1-naphthylamin-5-sulfonic acid, which is after being dried and pulverized a yellow powder soluble in water and in concentrated sulfuric acid with a yellow color; yielding upon reduction with stannous chlorid and hydrochloric acid 4-toluidin-2-sulfonyl-1-naphthylamin-5-sulfonic acid and amino-alpha-methylindol and dyeing wool from acid baths brilliant greenish-yellow shades, substantially as described.

In testimony whereof we have hereunto set our hands in the presence of two subscribing witnesses.

OSCAR DRESSEL. [L. S.]
RICHARD KOTHE. [L. S.]
HEINRICH HOERLEIN. [L. S.]

Witnesses:
OTTO KÖNIG,
CHAS. J. WRIGHT.